United States Patent
Suwijn et al.

[11] Patent Number: 5,904,457
[45] Date of Patent: May 18, 1999

[54] DETECTING TOOL WEAR BY THERMAL MONITORING OF WORKPIECE

[75] Inventors: Paul W. Suwijn, Pittsford; Hermann J. Stadtfeld, Richester, both of N.Y.

[73] Assignee: The Gleason Works, Rochester, N.Y.

[21] Appl. No.: 08/865,602

[22] Filed: May 29, 1997

Related U.S. Application Data

[60] Provisional application No. 60/020,574, Jun. 26, 1996.

[51] Int. Cl.⁶ ........................................ B23F 1/00
[52] U.S. Cl. ........................ 409/1; 318/571; 364/474.17; 408/6; 408/8; 409/131; 409/134; 409/195; 451/7
[58] Field of Search .............................. 409/1, 131, 134, 409/135, 136, 193, 195; 408/6, 8; 451/7; 364/474.15, 474.17, 474.18; 318/571, 641, 471

[56] References Cited

U.S. PATENT DOCUMENTS

| | | | |
|---|---|---|---|
| 3,066,578 | 12/1962 | Olton | 409/131 |
| 3,646,839 | 3/1972 | Shillam | 82/1 |
| 3,809,488 | 5/1974 | Sonderegger | 408/6 |
| 3,809,870 | 5/1974 | Auble et al. | |
| 3,873,816 | 3/1975 | Takeyama et al. | 318/561 |
| 4,214,191 | 7/1980 | Watanabe et al. | 318/561 |
| 4,438,598 | 3/1984 | Wohlmuth | 451/5 |
| 4,442,494 | 4/1984 | Fromson et al. | |
| 4,449,085 | 5/1984 | Gomoll | |
| 4,530,626 | 7/1985 | Sabbioni | |
| 4,563,897 | 1/1986 | Moore | |
| 4,757,307 | 7/1988 | Keramati et al. | 340/680 |
| 4,758,964 | 7/1988 | Bittner et al. | |
| 4,770,568 | 9/1988 | Perez et al. | |
| 4,894,644 | 1/1990 | Thomas | |
| 5,000,036 | 3/1991 | Yellowley et al. | |
| 5,030,920 | 7/1991 | Nakamura | |
| 5,070,655 | 12/1991 | Aggarwal | |
| 5,084,827 | 1/1992 | Demesy et al. | |
| 5,086,590 | 2/1992 | Athanasiou | |
| 5,228,814 | 7/1993 | Suwijn | |
| 5,477,118 | 12/1995 | Yoneda et al. | 318/569 |

FOREIGN PATENT DOCUMENTS

| | | | |
|---|---|---|---|
| 60-127944 | 7/1985 | Japan | 408/6 |
| 2058614 | 4/1981 | United Kingdom | |

*Primary Examiner*—Andrea L. Pitts
*Assistant Examiner*—Christopher Kirkman
*Attorney, Agent, or Firm*—Robert L. McDowell

[57] ABSTRACT

A method of monitoring the condition of a tool in a machining operation for producing a plurality of toothed workpieces. The process comprises measuring the temperature of at least a portion of the plurality of workpieces each at essentially a same predetermined amount of time after machining. The temperature of each measured workpiece is compared to at least one workpiece reference temperature value indicative of a wear condition of the tool. If the measured temperature is less than or equal to the workpiece reference temperature value, machining of subsequent parts continues, or, if the measured temperature is greater than the workpiece reference temperature, the machining operation is stopped.

3 Claims, 9 Drawing Sheets

DETECTING TOOL WEAR BY THERMAL MONITORING OF WORKPIECE

This Application claims benefit of Provisional Application 60/020,574 filed Jun. 26, 1996

FIELD OF THE INVENTION

The present invention is directed to machine tools, such as machines for producing toothed articles, for example, gears and the like. Particularly, the present invention pertains to systems which, by monitoring the workpiece, detect the deterioration of the cutting edge of tooling utilized on the machine tools.

BACKGROUND OF THE INVENTION

It has long been the desire of machine tool producers to provide systems which closely detect tool wear such as the edge-deterioration of a cutting tool. A deteriorated edge produces poor workpiece quality, adds more heat to the process, and draws more power for the operation of the tool. Deteriorated tool edges are often more susceptible to both chipping and chip welding. Chip packing between individual teeth may also be more prone to occur as wear progresses at the cutting edge. Any of these conditions can lead to the catastrophic failure of the tool and the mutilation of the workpiece at the time of the failure. Serious damage to machine spindle bearings and perishable tooling can also result from such events requiring significant machine downtime and expense to effect repair.

With the advent of the use of coatings (e.g. TiN, TiAlN) for super high-speed steel, solid carbide and ceramic-metal (cermet) cutting tools in the high-volume production of toothed articles, such as gear tooth generation by hobbing to produce spur and helical gears, splines and wormwheels, there is a need to closely monitor the condition of the tool to determine the wear of the coating. If a coating is completely worn through, damage can easily occur to the tool substrate resulting in a significant reduction in total tool life. With premium coated tools like those made from solid carbide, visual inspection is difficult given the low desirable edge wear limit, e.g. 0.004 inch (0.01 mm). To continually remove a tool to inspect under magnification results in considerable machine down-time, process equilibrium disturbance and increased machining costs. On the other hand, it is not cost efficient to replace a tool until it approaches its targeted wear limit.

One method of detecting tool wear has been to monitor the power consumed by the tool driveline of the machine tool. As a tool wears, more resistance to cutting is encountered and thus, more power is required to drive the tool. Increasing tool driveline power consumption is monitored and when a predetermined level is reached, which is indicative of an undesirable state of tool wear, the tool is removed for sharpening or replacement. Examples of monitoring power consumption are shown in U.S. Pat. Nos. 3,809,870 to Auble et al. and 4,442,494 to Fromson et al.

These types of systems can be quite adequate for detecting fairly gross deterioration of cutting edges and for detecting actual tool failure. However, because large inrushes of drive current are required to accelerate and decelerate the tool, it is typically necessary to set the warning limit at a threshold significantly higher than would be desirable in order to avoid nuisance interruptions in the process. Even if time intervals of tool acceleration and deceleration are ignored, it is often the case that variable cutting speeds are applied in order to lessen the peak cutting load on the tool and this feature also requires some leeway in threshold setting. Cutting loads and driveline efficiency changes at various speeds must also be factored in when determining a threshold setting.

Another method of detecting tool wear has been to provide vibration sensing systems which monitor the vibration of the tool during machining. Examples of this method are shown in U.S. Pat. Nos. 4,563,897 to Moore, 4,758,964 to Bittner et al. and 4,894,644 to Thomas. A shortcoming with vibration measurements based means is that these systems are only as reliable as the structural integrity of the machine. That is, vibrational systems are affected by harmonic responses in the driveline and structural elements, and by the mounting integrity of both the tool and workpiece spindles and supports. Furthermore, even small changes in speeds and feeds have complex effects on machining vibrations themselves, making it difficult to provide a reliable system.

Still another type of tool wear detecting system applies strain gauges to the outer races of spindle support bearings adjacent the cutting tool in an attempt to detect increases in radial and axial cutting forces which correlate with edge condition of the tool. However, preload conditions of spindle support bearings can change during the machine warm-up cycle, because of varying spindle rotational speeds or due to the presence or absence of cutting fluids. These changes diminish the reliability of data collected by the strain gauges and although special bearings and data processing equipment are available to lessen the effects of the changes, the significant costs involved result in an undesirable ultimate cost of the machine.

Yet another type of strain gauge detecting system involves applying the strain gauge equipment to the tool mounting arbor itself to measure torsional wind-up as an indicator of tool wear. Because of the constant rotation of the tool, strain gauge data is transmitted by radio signal to a receiver. While this system is successful within fairly broad tolerances, the system is highly vulnerable to the adverse conditions of machining and increases the cost of the tool mounting equipment substantially.

Still other tool wear detecting systems have been proposed which measure the axial displacement of the tool such as shown in U.S. Pat. Nos. 5,084,827 to Demesy et al. and 5,086,590 to Athanasiou. Monitoring tool wear by detecting power consumption and machine vibration is disclosed in U.S. Pat. No. 5,070,655 to Aggarwal. Monitoring tool wear by measuring the electrical resistance based on the temperature of the tool is taught in U.S. Pat. No. 5,000,036 to Yellowley et al. and by measuring the electrical resistance between the tool and workpiece is disclosed in U.S. Pat. No. 5,030,920 to Nakamura. Finally, a non-contact method of monitoring tool wear by inductively sensing the relative position of two machine parts is shown in U.S. Pat. No. 4,770,568 to Perez et al.

With all the above tool wear measuring systems, aspects of the machining process (e.g. power fluctuations, bearing load variations, exposure to machining environment, etc.) provide obstacles to proper and accurate performance of the particular measuring system. There remains a need for a tool wear monitoring system where influences of both the machining process and ambient effects are essentially non-existent.

It is an object of the present invention to provide a method which detects the normal, progressive deterioration of the working edges of a cutting or grinding tool in order to terminate operations at a predetermined limit of edge wear.

It is another object of the present invention to provide a method which detects relatively rapid, abnormal deterioration of the working edges of the cutting or grinding tool in order to discontinue machining operations before further damage occurs.

It is yet another object of the present invention to provide a method that is independent of the vigilance of the machine operator and also sufficiently sensitive to distinguish between small amounts of tool edge wear which may not be visible to the machine operator.

SUMMARY OF THE INVENTION

The present invention provides for a method of monitoring the condition of a tool in a machining operation for producing a plurality of toothed workpieces.

The inventive process comprises measuring the temperature of at least a portion of the plurality of workpieces each at essentially a same predetermined amount of time after machining. The temperature of each measured workpiece is compared to at least one workpiece reference temperature value indicative of a wear condition of the tool. If the measured temperature is less than or equal to the workpiece reference temperature, machining of subsequent parts continues, or, if the measured temperature is greater than the workpiece reference temperature, the machining operation is stopped.

The reference temperature can be the temperature of the previously cut part whereby a significant difference in temperatures between the just-cut part and the previously cut part may indicate a defective area of the tool. Also, the reference temperature may be a known temperature indicative of a dull tool whereby a workpiece temperature approaching or achieving this reference temperature indicates the tool is worn and the process is then stopped for tool sharpening or replacement.

The present invention further comprises a thermal sampling mechanism for determining the temperature of the machined workpieces.

By referencing the pattern of prior workpiece temperatures and by providing particular patterns of confirming sampling, ambient effects of atmosphere, tool body temperature and support spindle temperatures are overcome.

DETAILED DESCRIPTION OF THE PREFERRED EMBODIMENTS

The details of the present invention will now be discussed with reference to the accompanying drawing figures.

The present invention may be carried out on any machine capable of producing toothed articles and is especially suited for high volume production processes where minimum machine down-time is crucial. In particular, the present invention is well suited for gear tooth generating applications such as hobbing, and in particular dry hobbing, whereby spur and helical gears, splines or wormwheels are produced. For example, one type of preferred machine tool for carrying out such hobbing processes is a multi-axis computer controlled hobbing machine as shown in U.S. Pat. No. 5,228,814 to Suwijn the disclosure of which is hereby incorporated by reference.

Most gear generating tools are designed for repeated use with a certain number of reconditionings provided for. The process budget is determined in some degree by the variance between the actual tool survival history and the ideal. Reducing per piece tool cost, as well as inventory cost, depends to a large degree upon successful forecastings of tool life. Thus, it is desirable to terminate ongoing machining operations when the tool edge deterioration first reaches a particular point or limit in the wear curve, or shortly before.

Figure 1:
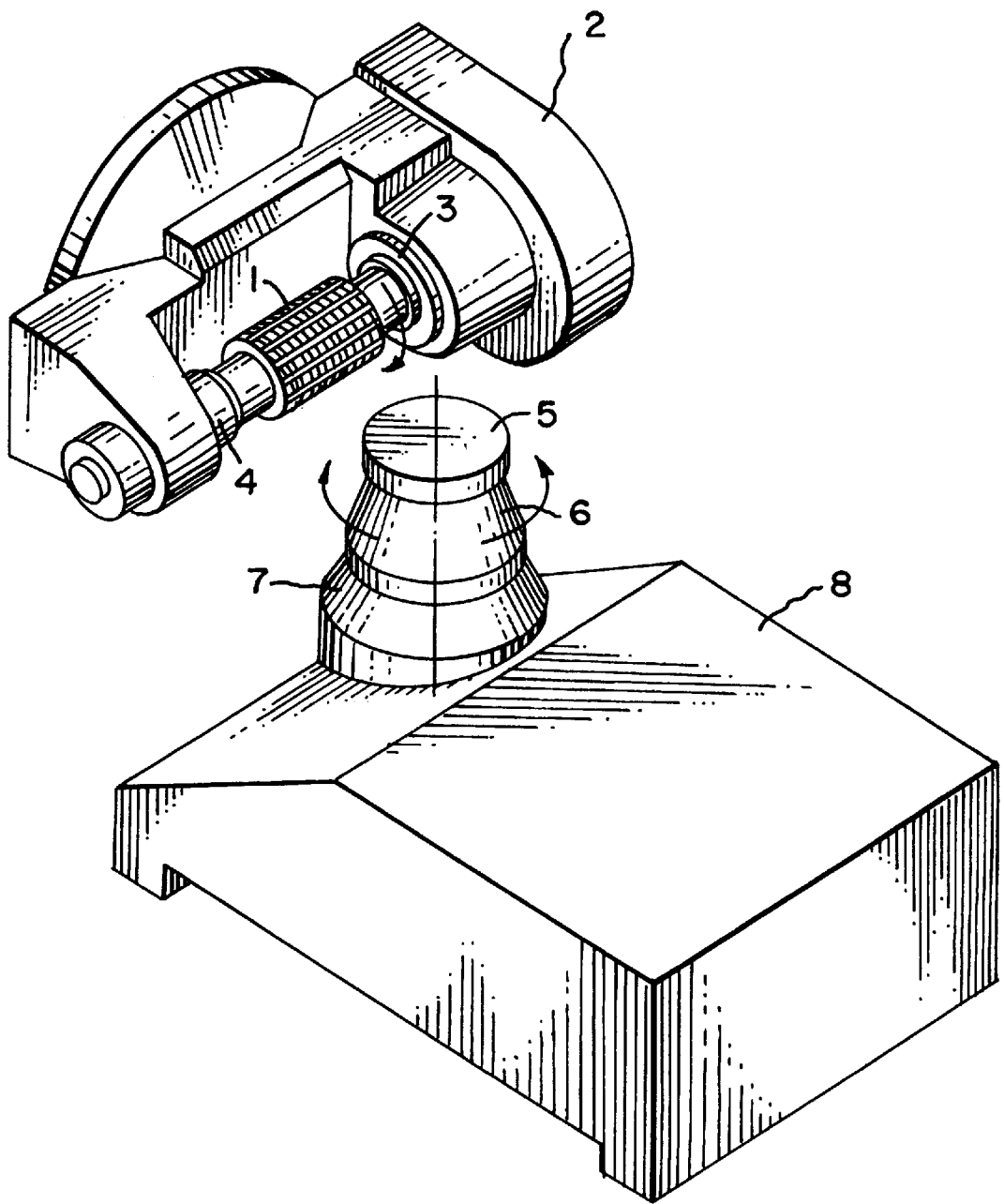
FIG. 1 schematically illustrates a tool-to-work arrangement on a gear hobbing machine.

FIG. 1 is a schematic representation of a tool-to-work relationship on a gear hobbing machine such as that disclosed in the above-referenced patent. Hobbing tool 1 is supported for rotation by drive spindle 3 and outboard support spindle 4. The tool 1 comprises a plurality of individual teeth helically arranged about the tool for generating of gear tooth spaces in workpiece 5. Both spindles 3 and 4 are contained in trunnion 2 which is angularly adjustable to produce various engagement angles between tool 1 and workpiece 5. Rotation of drive spindle 3 is produced by a spindle motor and driveline arrangements (not shown).

Workpiece 5 is clamped on fixture 6 which in turn is mounted to rotating work table 7. Driveline means (not shown) for rotating work table 7 are contained within housing 8 with the driveline powered by a work drive servomotor (not shown). Rotation of the hobbing tool 1 and workpiece 5 are timed to one another with orthogonal linear motions superimposed to generate the full face-width of the gear workpiece. The rotation of work table 7 may be accelerated or decelerated during tooth-space generation to create helical tooth forms. The rotation of tool drive spindle 3 may also be accelerated or decelerated during generation to lower peak power levels and chip loads.

Figure 2:
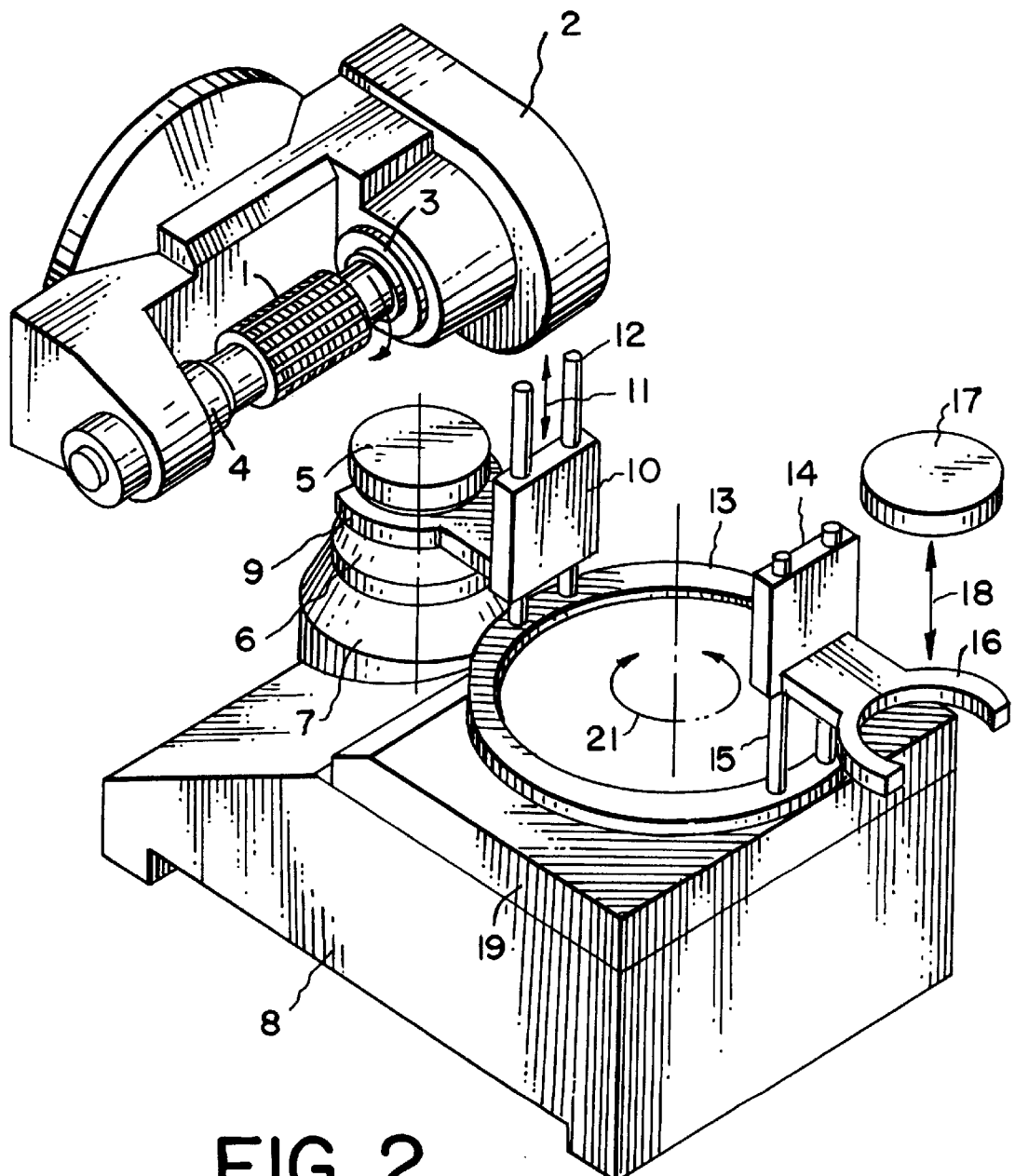
FIG. 2 illustrates the addition of a loading/unloading system to the arrangement of FIG. 1.

FIG. 2 illustrates the addition of a typical automatic loading system, a two-station carousel loader, to the tool-work arrangement of FIG. 1. Of course, other loading systems which rapidly load and unload workpieces are also within the scope of the present invention. Carousel transfer ring 13, which normally surrounds a tailstock column structure of which only flange 19 is shown, supports two or more slides 10 and 14 which are vertically translatable on respective guidebars 12 and 15.

At work table 7, the vertical motion 11 of slide 10 serves to lower the workpiece 5 onto fixture 6, and likewise to raise it to a clearance height which permits rotation after completion of machining. Carriers 9 and 16 serve to support the workpieces 5 and 17 with the workpiece 17 representing both the outgoing completed workpiece and the next incoming blank which are loaded and removed from the carrier 16, for example, along motion 18 by any variety of known means during the machining cycle of workpiece 5. Slide 14 and carrier 16 are shielded from the machining area by the tailstock column structure within transfer ring 13 making this load/unload location well qualified as a thermal sampling site.

The raising motion 11 of the completed workpiece 5 and the half-circular rotation 21 (see FIG. 3 also) imparted by a drive means (not shown) applied to transfer ring 13 are both accomplished very quickly during the reset of machine orthogonal axes motions in preparation for the next machining cycle. Unloading and reloading motions 18 likewise require only a small portion of the machining time necessary to complete workpiece 5. Therefore, an idle time during cutting exists in which just-completed workpiece 17, while still present in the carrier 16, can be thermally sampled without causing delay in machining productivity. Time intervals required for raising and rotating the completed workpiece to carrier position 16 are very brief and constant, so sampling can occur without a meaningful workpiece cooldown interval. The thermal sampling time intervals of completed workpiece 17 can also be held constant, before unloading and reloading action 18 occurs.

Figure 3:
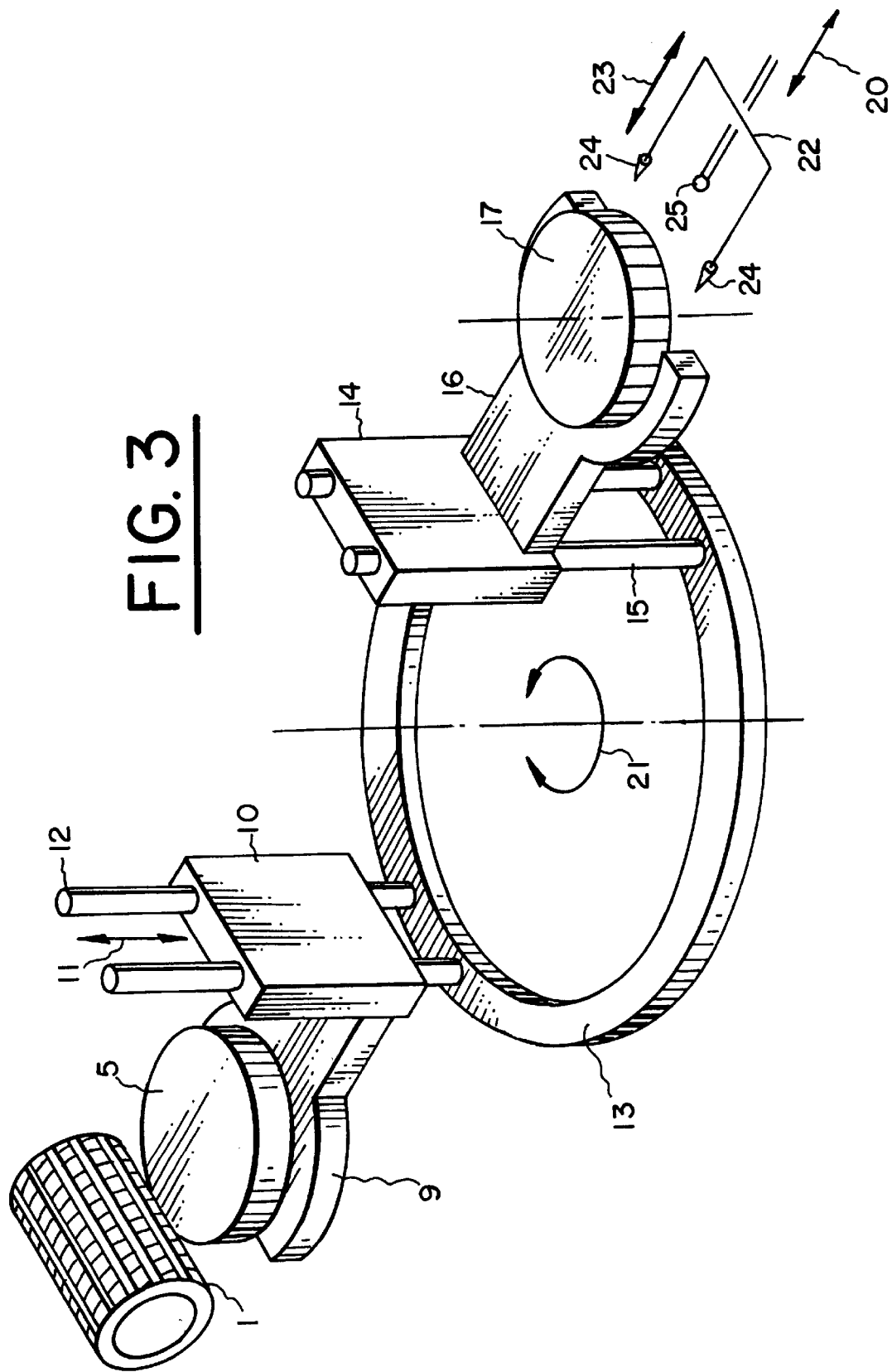
FIG. 3 depicts a completed workpiece in an unload position prior to thermal probing.

FIG. 3 shows just-completed workpiece 17 in its normal position following rotational motion 21. While hobbing tool 1 is beginning to engage workpiece 5, contact points 24 carried on arms 22 are brought forward 23 to secure exiting gear 17 in a predetermined angular position against the backing of carrier 16. Since exiting gear 17 arrives in a random angular orientation, the preorienting motion of contact points 24 is helpful in producing a subsequent repeatable contact between the gear teeth and thermal probe 25 which translates along motion path 20.

Figure 4:
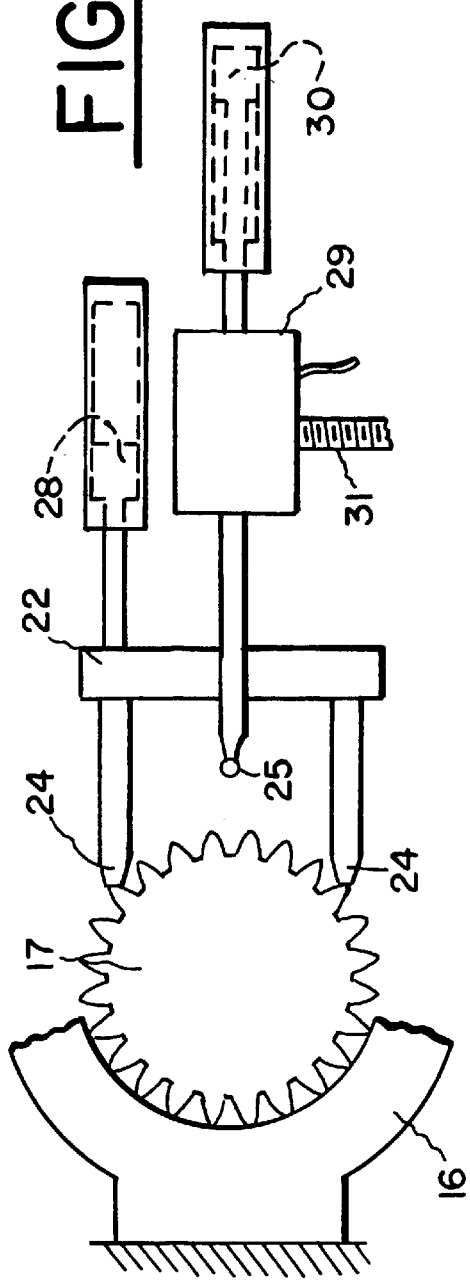
FIG. 4 illustrates a preorienting mechanism for positioning the workpiece for thermal probing.
Figure 5:
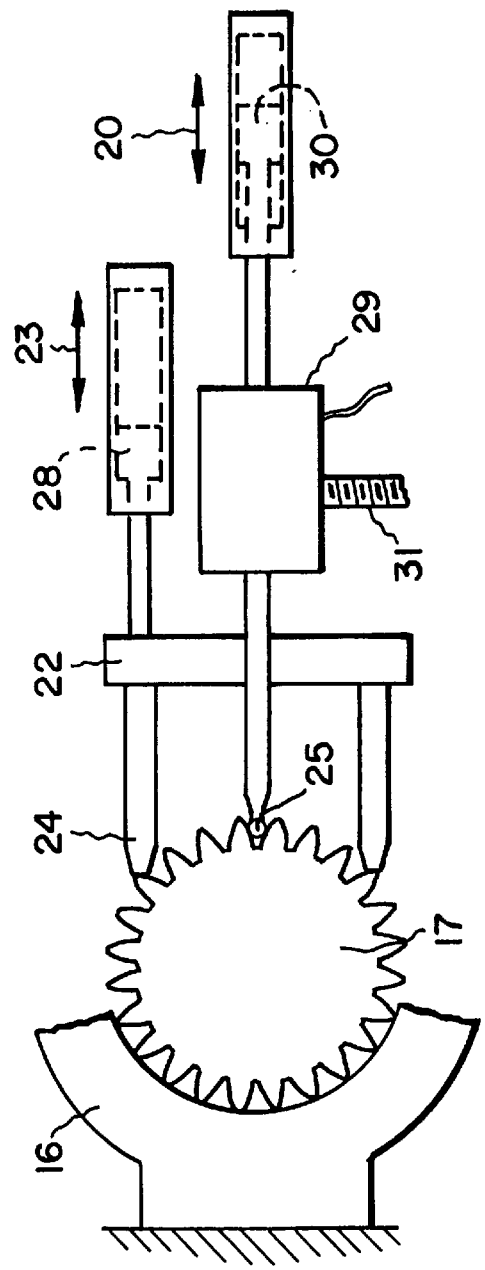
FIG. 5 shows thermal probing of the workpiece.

FIGS. 4 and 5 show the sequence of preorienting and thermal probe actuations. Preorienting contacts 24 are moved into contact with gear 17 by activation of piston 28 followed by probe 25, and output 29, being urged into contact with gear 17 by action of piston 30. Screw 31 adjusts the crosswise position of probe elements 25, 29 and 30 to fine-tune the contacting position with the workpiece in the initial setup. Preorienting contact points 24 are preferably adjustable along bar 22 to adjust for various workpiece configurations. Deliberate hysteresis may be provided in screw mechanism 31 so that probe 25 will seat with equal contact on both flanks of the sampled toothspace of exiting workpiece 17.

While the above-described configuration is preferred, the present invention is not limited thereto. However, it is of the utmost importance to select a site, sheltered from the adversity of the machining area, to sample the exiting workpiece 17 at a quick, constant interval after completion, for a constant sampling interval which does not interfere with ongoing machining activity.

Probe components 25, 29, 30, 31 may be oriented in any other convenient arrangements such as perpendicular to exiting workpiece 17 and multiple thermal probes may be used for correlation purposes. Likewise, relocating components 22, 24, 28 may be positioned in other angular orientations. Contacting type thermal probe 25 may be replaced with a non-contact type thermal probe, such as an infrared sensor, or, with a contact probe having significant lateral play, for example, via spring mounting with either alternative being utilized with or without the complement of preorienting apparatus 22, 24, 28. Blackening compound may be applied to the infrared viewing area of exiting workpiece 17 to achieve reliable measurements without problems of workpiece reflectance. The face of exiting workpiece 17 may be sampled within the root line of the tooth form and in this case, a preorienting device may not be required.

Figure 6:
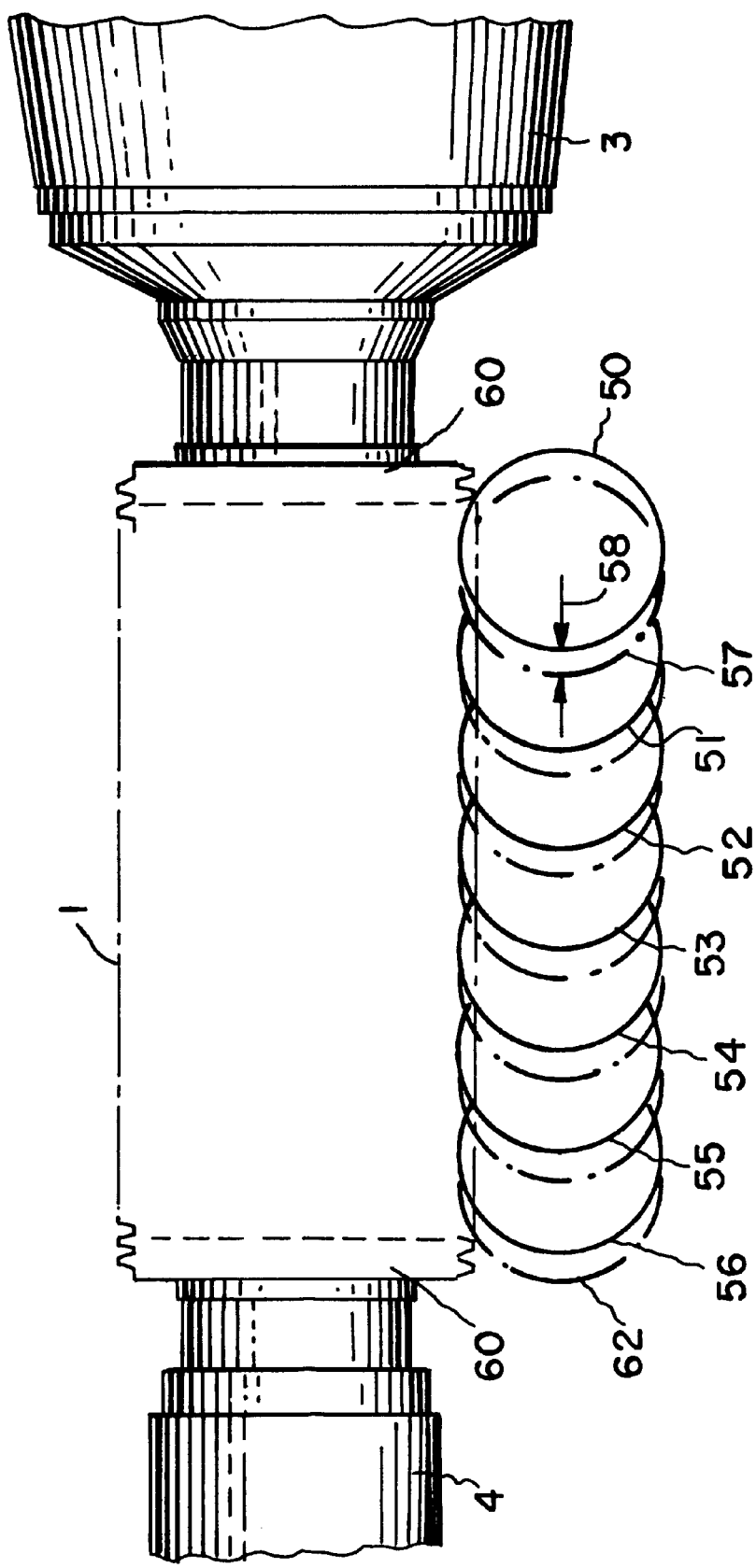
FIG. 6 schematically depicts workpiece shifting and offset along the length of a hobbing tool.

FIG. 6 illustrates one type of hobbing method wherein as successive workpieces 51–56 are cut, each successive workpiece is shifted a predetermined amount (e.g. 4–5 mm) to distribute wear along the entire hobbing tool. When insufficient space remains to conduct another shift (i.e. after workpiece 56 is cut), the next pass begins and workpiece 57 is positioned at nearly the same location as workpiece 50 except that it is offset by an amount 58, for example 0.75 mm, so as to further distribute wear along the tool. Usually the extreme end portions 60 of the tool are not utilized for machining since these areas comprise some partial hob teeth due to the beginning or end of the helically arranged tooth pattern inherent on a hobbing tool.

Figure 7:
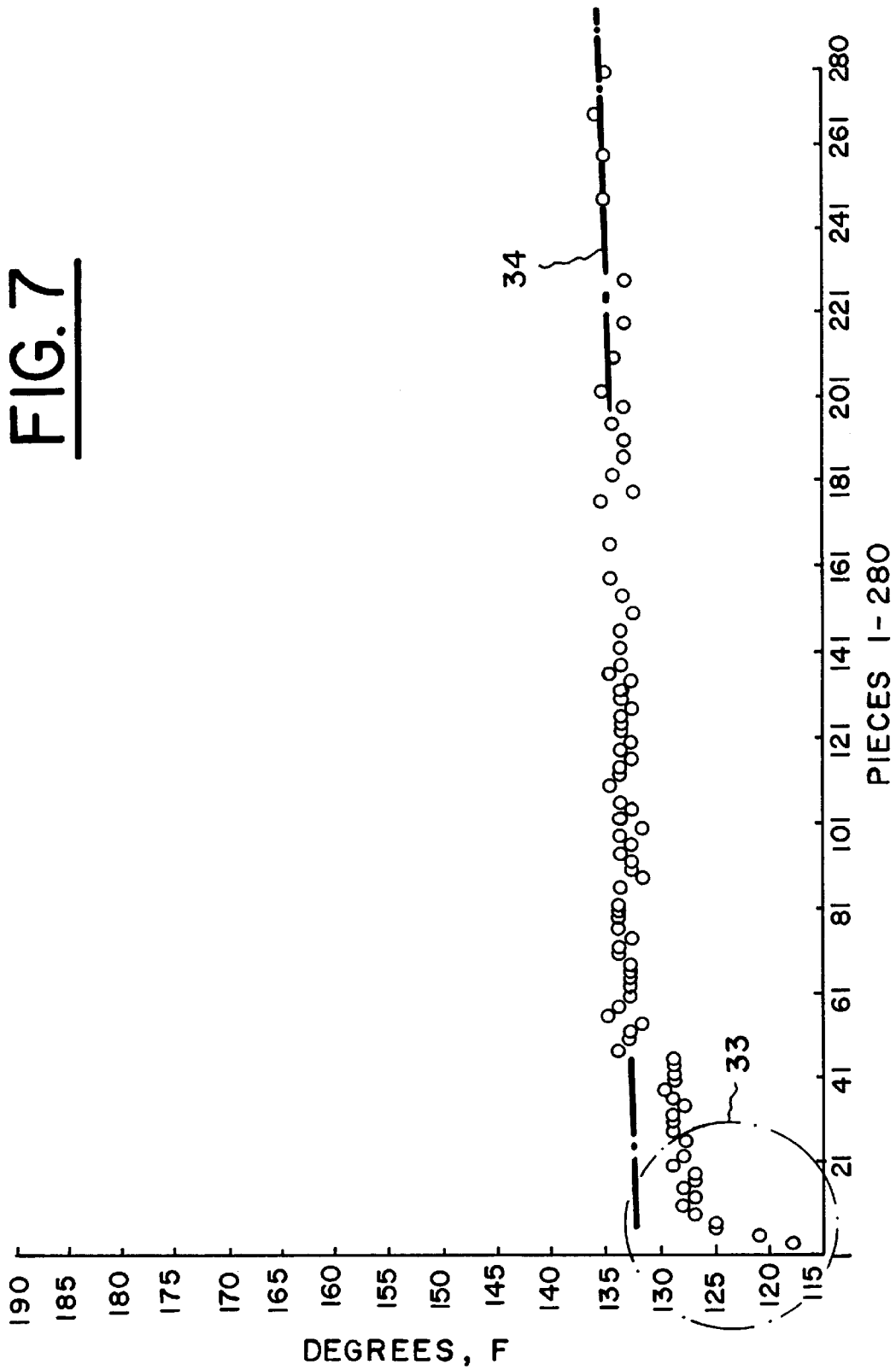
FIGS. 7, 8, 9 and 10 illustrate thermal records for a succession of dry-hobbed gear workpieces.

FIG. 7 illustrates a thermal record of workpiece exiting temperatures of a plurality of samples taken from a succession of 280 gear workpieces (19-tooth planet pinions) dry-hobbed from a cold start machine tool condition using a TiAlN coated (5 $\mu$m thickness), solid carbide hobbing tool at a rate of five pieces per minute on a machine of the type referred to above with respect to U.S. Pat. No. 5,228,814. FIG. 7 represents Phase 1 of an overall workpiece sample numbering 2804 pieces. The entire test run consisted of ten phases with each phase comprising approximately 280 machined workpieces. For purposes of the example, each phase began at the same position on the hobbing tool with each phase consisting of four workpieces per pass with a shifting distance of 4.6 mm between each workpiece and an offset distance of 0.75 mm between each pass. In this manner, the length of tool utilized was small thus allowing wear results to be observed with a relatively small number of workpieces being cut. However, the results obtained are applicable to actual production practices where the entire workable length of the tool is utilized.

It can be seen, after an initial warm-up of the tool teeth represented by area 33 and adjustment of the probe position after workpiece number 46, the exiting machined workpieces gradually increase in measured temperature from slightly less to slightly more than 135° F. (57.2° C.) at the end of Phase 1 as shown by the positive increase in slope of line 34.

Figure 8:
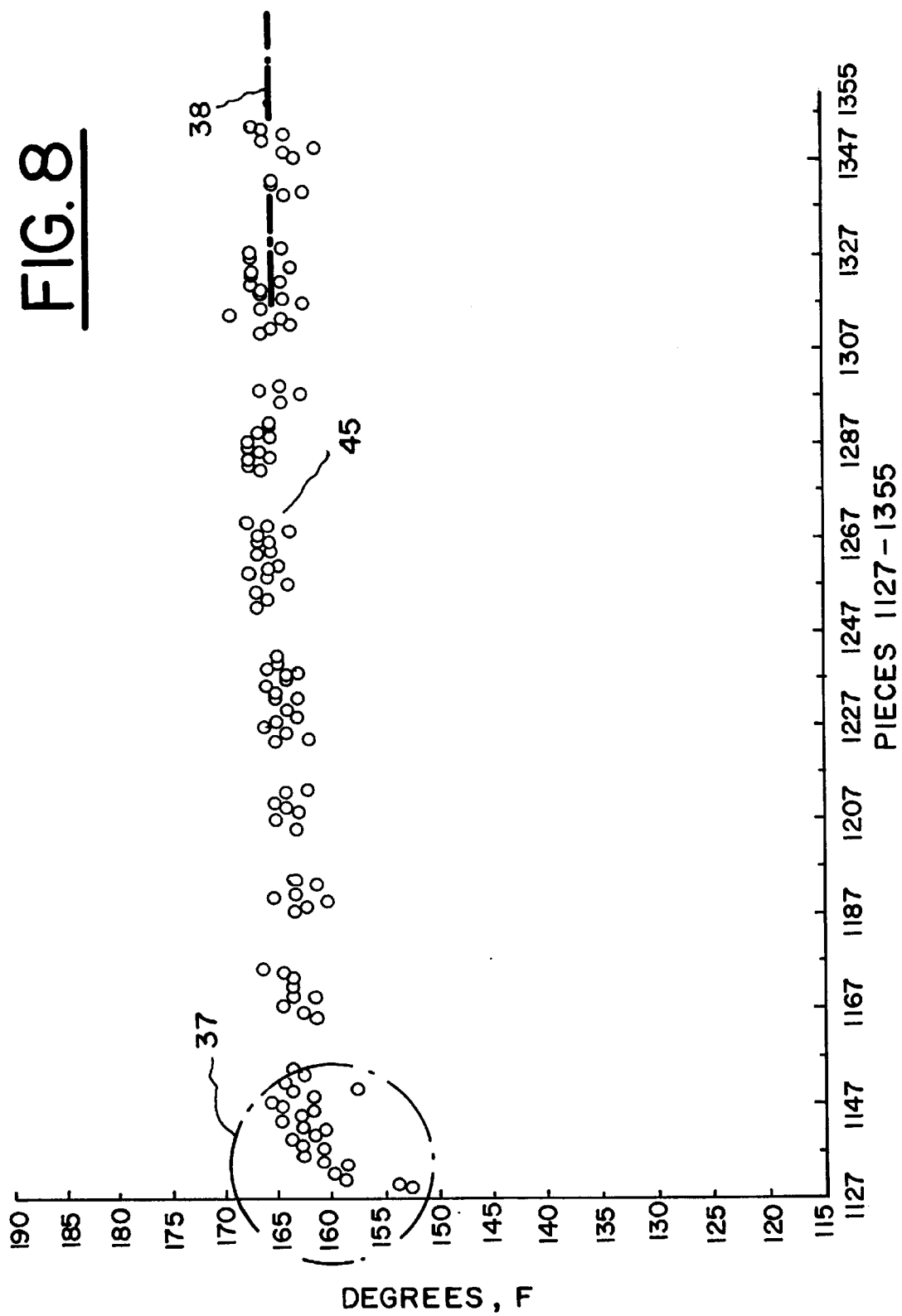

FIG. 8 illustrates the thermal record of workpiece exiting temperatures of a plurality of samples taken from the Phase 5, workpiece numbers 1127–1355. It can be seen that after the machine warm-up period 37, the slope of line 38 continues to increase as the tool wears and after more than one thousand workpieces being cut, the exiting temperature of the workpieces is now about 167° F. (75° C.) as compared to 135° F. (57.2° C.) at the end of Phase 1. It can also been seen that the machined workpieces are exhibiting a more scattered pattern 45 of exit temperatures indicative of shifting from less worn to more worn areas of the tool. The "scatter" of data will be discussed further below.

Figure 9:
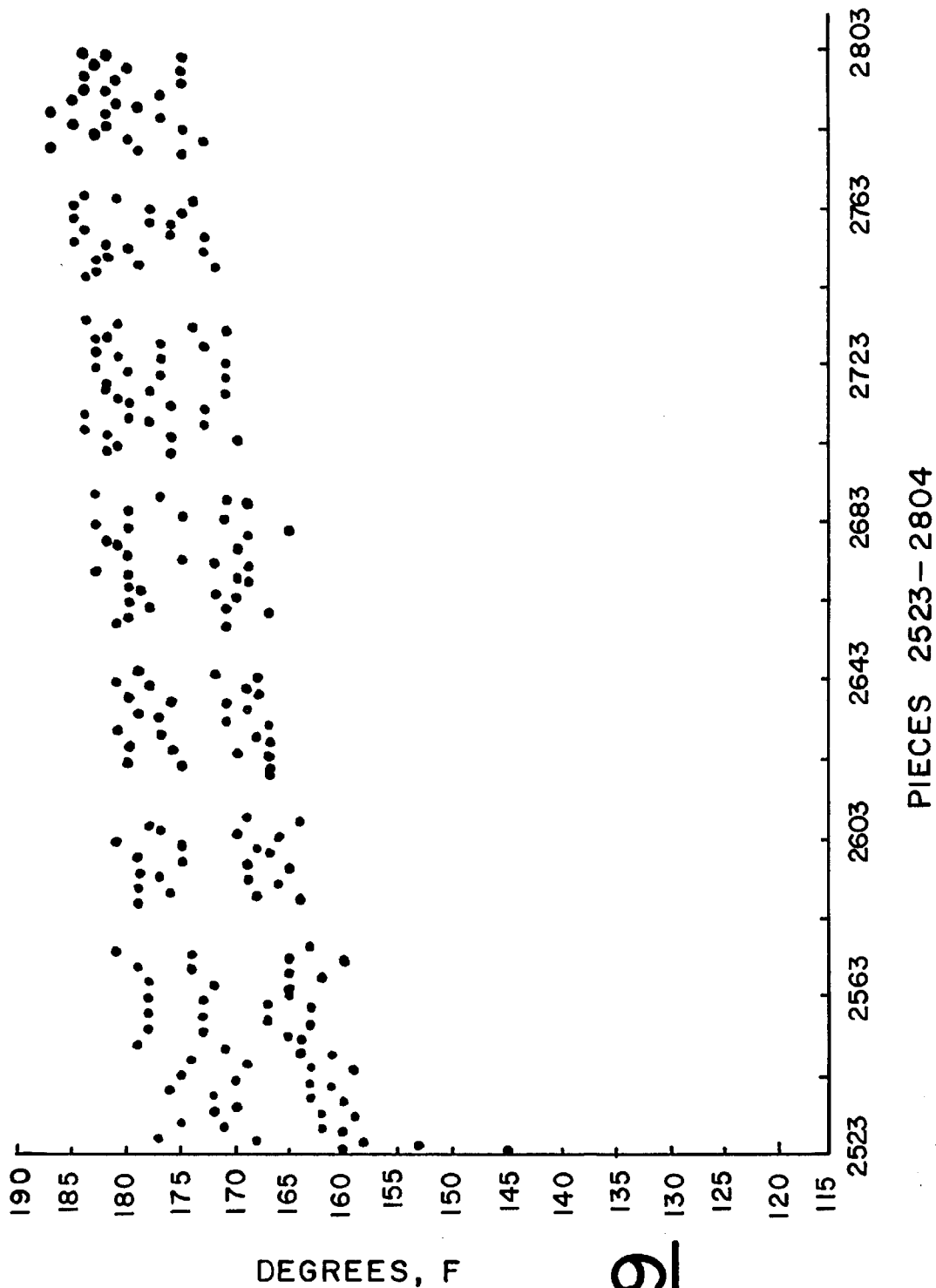

FIG. 9 illustrates the thermal record of workpiece exiting temperatures of a plurality of samples taken from the Phase 10, workpiece numbers 2523–2804. After machine warm-up of about twenty workpieces, it is seen that the temperatures plotted are highly scattered but an upward trending slope can still be noted with final temperatures being approximately 185° F. (85° C.). After this final phase, the hobbing tool was removed for inspection under magnification which revealed substantial coating wear-through at locations exposed to the most cutting action such as at areas away from the initial workpiece position for each phase.

Figure 10:
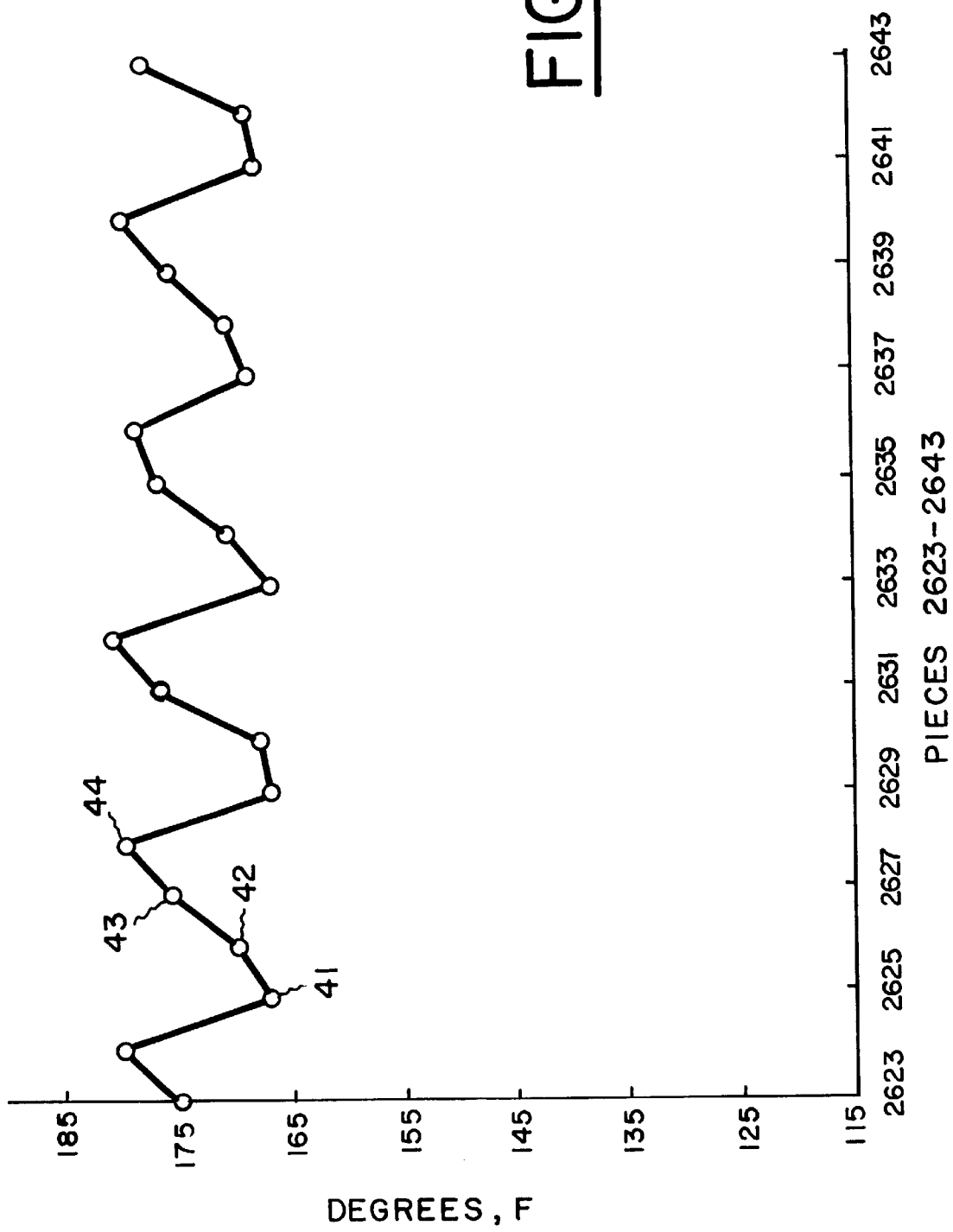

FIG. 10 is an expanded view of the exit temperatures of workpieces 2623–2643 in FIG. 9 to illustrate scatter. Scatter occurs and becomes increasingly evident as wear progresses in a tool. Looking specifically at pieces 2625–2628, identified by 41, 42, 43 and 44 respectively, and examining their respective exit temperatures and machining positions on the tool, it is seen that as each workpiece is shifted from an area of less tool wear into an area of greater tool wear as is the case with pieces 2625–2628 the exit temperature increases as the wear condition of the tool is greater. Specifically, workpiece 41 was cut by an area of the tool near the initial position of each phase and, since shifting and offsetting resulted in subsequent workpieces being moved away from this location, this area of the tool had less wear than other areas as is shown by the workpiece temperature of about 166° F. (74.4° C.).

As subsequent workpieces 42, 43 and 44 are shifted into areas of increasing wear, their exit temperatures also increase to 170° F. (76.7° C. ), 176° F. (80° C.) and 180° F. (82.2° C.) respectively. Examination of the tool as the increasing wear (e.g. thinner or worn-through coating) on the tool as the distance increases away from the location of initial and, due to shifting and offset, limited machining and into the area of the tool which is subject to repeated machining since workpieces are not shifted away from this area. Thus it is evident that as the tool wears, more heat is generated during machining with the amount of heat increasing as the amount of tool wear increases.

The information collected in this experiment is useful in establishing a maximum workpiece exit temperature, for example between 180°–185° F. (82.2°–850° C.) for jobs employing similar tools to cut these types of parts, at which temperature the hobbing tool could be removed after being utilized to cut an optimal number of parts but before damage occurred to the tool substrate. In this manner, a tool could be recoated without the need for resharpening thus saving downtime and expense. The machine tool controller may be programmed to monitor exiting workpiece temperatures and stop the process when the programmed maximum temperature was detected.

For any tool and workpiece for which temperature data is not available, an initial production run with periodic tool inspections is necessary to "teach" the machine tool the appropriate exit temperature which represents the end of the useful coating life prior to substrate damage occurring. However, since many hobbing applications comprise continual production runs for a single type of gear, such as is found in the automotive industry, the initial investment of time to determine tool wear and workpiece exit temperature data is minimal given the total number of pieces produced.

If desired, initial workpiece data can be stored as a baseline measurement to which is compared the exit temperature of subsequently machined parts. For example, in FIG. 7, an initial workpiece exit temperature of 135° F. (57.2° C.) could be established as a baseline temperature since this temperature resulted from initial workpieces cut with a sharpened and freshly coated tool. When comparing this baseline temperature to the final temperature shown in FIG. 9, 185° F. (85° C.), a difference of 50° F. (27.8° C.) is noted which may also be programmed in the computer control as a permitted tolerance above which machining would cease.

Another manner in which measured data may be considered is by a comparison of the exit temperature of a cut piece being compared with the exit temperature of the previously cut part. For example, in FIG. 10, piece 43 has an exit temperature of 176° F. (80° C.) while that of piece 44 is 180° F. (82.2° C.), thus a difference of 4° F. (2.2° C.). The machine tool controller may be programmed to recognize a difference, for example, of greater than 5° F. (2.8° C.) and when such a difference was detected, machining may be stopped or additional pieces may be machined at locations on the tool corresponding to the respective locations where the two pieces were cut to verify the measurements. Also, a workpiece could be cut at the next shift position and also compared to the workpiece temperature in question to determine if the reading obtained from the suspect workpiece is within an acceptable tolerance.

A sharp increase in exiting temperature from one piece to the next could be indicative of a localized fault on the tool such as lost coating or a chipped tooth and the machine tool may be programmed to avoid this section of the hobbing tool while using the remaining portions which are defect-free. In this manner, machining can continue on the acceptable portions of the hob thus avoiding the expense of new or reconditioned tool at least until the remaining portions of the tool are worn.

If desired, a portion of the tool can be reserved for repeatedly establishing a baseline. As an example, far left position 62 in FIG. 6 may be reserved for occasional machining of workpieces to continually establish a baseline temperature of exiting workpieces. Since this position is little used, it provides a baseline similar to the initial workpieces machined as shown in FIG. 7 except that the temperature of the reserved area will rise as the hob is used because of heat transfer from the actual machining area of the hobbing tool. However, in any case, several workpieces should be cut at each instance of establishing a baseline in order to bring the hob teeth to a constant temperature in the manner of area 33 of FIG. 7 or area 37 of FIG. 8. In this manner, any effects on the hob teeth due to ambient conditions is eliminated.

In an example, the initial temperature of the reserved region may be 135° F. (57.2° C.). A temperature tolerance is selected such as 15° F. (8.4° C.) whereby machining is stopped or a baseline check is commenced if the tolerance amount is exceeded. Further to this example, if after a number of pieces were cut (e.g. 500) a workpiece exit temperature is measured at 155° F. (68.3° C.), the machine tool controller may be programmed to move the cutting action to the reserved portion of the tool and cut several pieces which would then provide a check of the baseline temperature. If, for example, the baseline check revealed a new temperature of 145° F. (62.8° C.) then machining would continue with the new maximum tolerated temperature being 160° F. (71.1° C.). However, if the baseline check showed a temperature that still differed by more than the tolerance amount from the last cut workpiece, then machining would stop or a workpiece would be machined on another section of the tool as a check against a localized deformity on the tool. As an alternative to random baseline checks, the machine controller may be programmed to periodically establish baseline temperatures, such as every 250 pieces for example.

The pattern of exiting workpiece temperature data can simultaneously be used as a datum for the compensation of taper, lead and size errors in the workpiece. As exiting workpiece temperature increases substantially over the life of the tool, this correlates with diametral and face-width growth during cutting since the workpiece blank begins at ambient. The workpiece is literally larger at the end of a cycle versus at the initiation of machining. Thus it can be seen that correction of taper is advantageous as temperatures rise. Likewise, face-width growth distorts lead angle which may be compensated by small ratioing adjustments based on the detected thermal data. Part size, although more complex, may be addressed by adjustments to machine structure variables in response to input thermal data.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of monitoring the condition of a tool in a machining operation by measuring exit temperatures of a plurality of workpieces produced by said machining operation, said method comprising:

measuring the temperature of at least a portion of said plurality of workpieces each at essentially the same amount of time after said machining, determining an actual temperature difference between the temperature of a just-machined workpiece and a previously obtained temperature of a workpiece having been machined at the beginning of said machining operation, comparing the temperature of each measured workpiece to at least one workpiece reference temperature value indicative of undesirable tool condition wherein said at least one workpiece reference temperature value comprises a predetermined temperature difference amount defined by the difference between a predetermined maximum workpiece exit temperature value and the temperature of a machined workpiece at the beginning of said machining operation, and, (a) continuing said machining operation if said measured temperature is less than or equal to said at least one workpiece reference temperature value, or, (b) stopping said machining operation if said measured temperature is greater than said at least one workpiece reference temperature value.

2. A method of monitoring the condition of a tool in a machining operation by measuring exit temperatures of a plurality of workpieces produced by said machining operation, said method comprising:

measuring the temperature of at least a portion of said plurality of workpieces each at essentially the same amount of time after said machining, comparing the temperature of each measured workpiece to at least one workpiece reference temperature value indicative of undesirable tool condition wherein said at least one workpiece reference temperature value comprises a predetermined amount in excess of the exit temperature of the immediately preceding machined workpiece, and, (a) continuing said machining operation if said measured temperature is less than or equal to said at least one workpiece reference temperature value, or, (b) stopping said machining operation if said measured temperature is greater than said at least one workpiece reference temperature value.

3. A method of monitoring the condition of a tool in a machining operation by measuring exit temperatures of a plurality of workpieces produced by said machining operation, said method comprising:

measuring the temperature of at least a portion of said plurality of workpieces each at essentially the same amount of time after said machining, comparing the temperature of each measured workpiece to at least one workpiece reference temperature value indicative of undesirable tool condition wherein said at least one workpiece reference temperature value comprises a predetermined amount in excess of a baseline temperature, said base line temperature being repeatedly established by periodically machining a workpiece at a location on said tool reserved for establishing said baseline temperature, and, (a) continuing said machining operation if said measured temperature is less than or equal to said at least one workpiece reference temperature value, or, (b) stopping said machining operation if said measured temperature is greater than said at least one workpiece reference temperature value.

* * * * *